No. 771,530. PATENTED OCT. 4, 1904.
J. CARD.
TURF TRIMMER.
APPLICATION FILED DEC. 7, 1903.
NO MODEL.
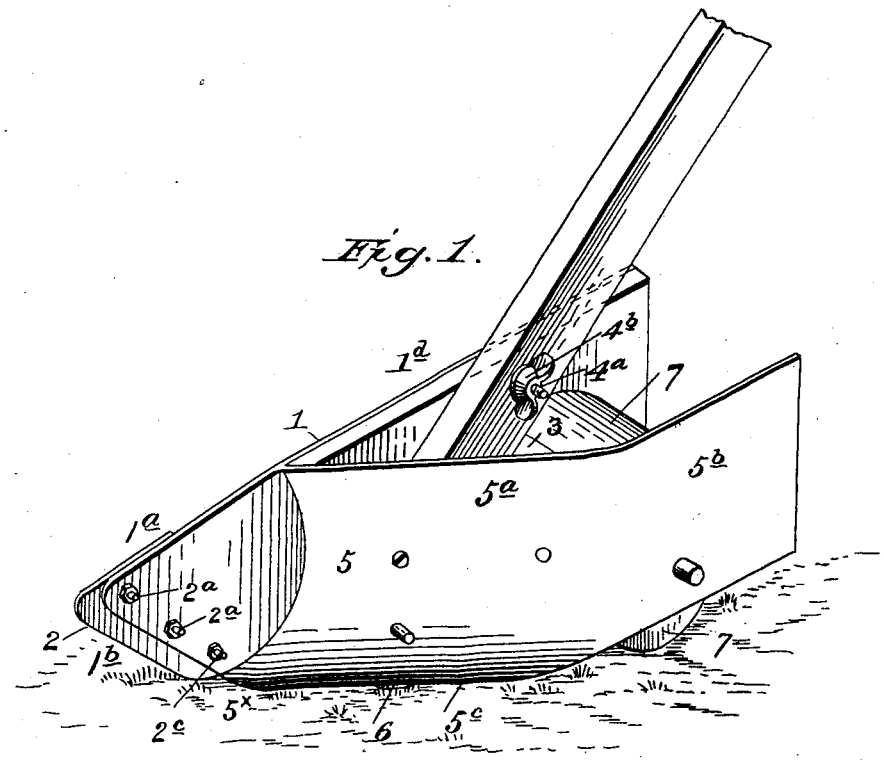
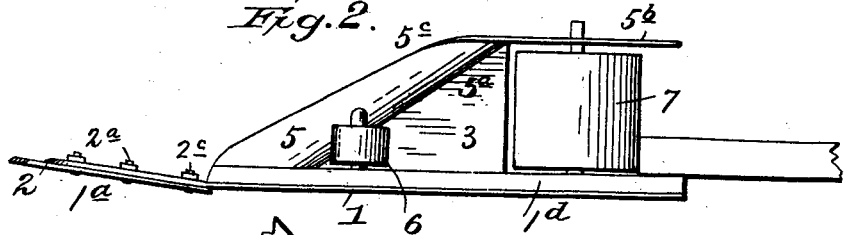
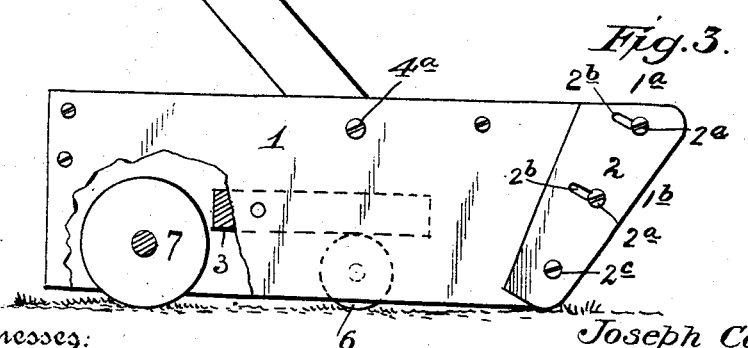
Inventor:
Joseph Card, No. 771,530.

Patented October 4, 1904.

UNITED STATES PATENT OFFICE.

JOSEPH CARD, OF LYNN, MASSACHUSETTS.

TURF-TRIMMER.

SPECIFICATION forming part of Letters Patent No. 771,530, dated October 4, 1904.

Application filed December 7, 1903. Serial No. 184,099. (No model.)

*To all whom it may concern:*

Be it known that I, JOSEPH CARD, a citizen of the United States, residing at Lynn, in the county of Essex and State of Massachusetts, have invented new and useful Improvements in Turf-Trimmers, of which the following is a specification.

My invention relates to improvements in what may be termed "turf-trimmers" especially designed for use along lawns.

It has for its object to provide for the ready and effective trimming of lawns, more particularly to remove the turf grown over upon the latter, along the edges thereof, and to effect the simultaneous scraping of the adjoining footwalk, all in a simple and expeditious manner.

Said invention consists of the details of construction and combination of parts substantially as hereinafter more fully disclosed by the following description and particularly pointed out in the claims concluding the same.

In the accompanying drawings, illustrating the preferred embodiment of my invention, Figure 1 is a perspective view thereof. Fig. 2 is a bottom plan. Fig. 3 is a broken opposite side view.

In the carrying out of my invention I provide what may be termed a "landside" member 1, preferably consisting of a vertical cast-metal plate of suitable depth or cross-sectional area and longitudinal dimension, with its greater portion straight or rectilinear, the remainder or forward portion $1^b$, however, being bent or inclined laterally away from the plane of the landside, as seen in Figs. 1 and 2. This declination or divergence from a right line permits the bringing or directing of the forward cutting edge of the implement in close proximity to the margin or edge of the lawn to effectively act upon the turf for its removal. Said forward end portion $1^a$ is also inclined along its forward edge from the bottom edge upward and outward or forward, as shown at $1^b$, the inclination or slope being quite marked or pronounced in the forward direction, and to said inclined forward end is applied laterally a blade or cutter 2, arranged in a corresponding inclination therewith, its cutting edge of course projecting beyond said end. Said blade or cutter is adapted to be adjusted at the required angle of presentation to the object or turf to be cut by means of adjusting screw-bolts $2^a$, passing through the forward end portion $1^a$ of the plate 1 and through slots $2^b$ in said blade or cutter, as shown, a bottom screw-bolt $2^c$ also passing through said parts and serving as a pivot upon which said blade or cutter is moved in effecting its adjustment. Said plate or landside 1 is backed by a preferably wooden piece $1^d$, suitably secured thereto and to the latter and to a block 3. Also secured to said part $1^d$ is connected or held, preferably by a holding screw-bolt and thumb-nut $4^a$ $4^b$, the lower end of a handle for the convenient manipulation of the implement.

Cast with the plate or landside 1 and joining or connecting therewith near the angle formed by the bent or deflected forward end portion $1^a$ with said plate is a second plate 5, bolted to the block or part 3 and laterally inclined outward and rearward the greater portion of its length, as at $5^a$, the remaining portion thereof extending parallel with plate or landside 1, as at $5^b$. Said laterally and rearward inclined portion $5^a$ is curved or carried forward as at its lower edge clear to the corresponding edge of the forward end portion $1^a$, as at $5^x$, and thence further inclined downward and outward along its bottom edge, as at $5^c$, said plate or member 5 thus assuming the form of a combined moldboard and share, as shown. Said bottom edge $5^c$ of the member 5 is adapted to serve as a scraper to scrape the gravel footwalk adjoining the lawn or turf being trimmed by the cutter or blade 2, provision thus being made for effecting both of these at one operation or simultaneously.

Intermediately of the plates or members 1 $1^a$ are suitably journaled in position a small forward roll or truck 6 and a larger roll or truck 7, arranged a suitable distance from and in rear of the first-referred-to roll, as shown, for the convenient movement of the implement in operating the same, as will be readily understood.

Latitude is allowed herein as to details, as they may be changed as circumstances suggest without departing from the spirit of my invention and said invention yet remain intact and be protected.

What I claim is—

1. A device of the character described, comprising a right-lined plate or member equipped with a cutter at its forward end and a moldboard and share-like member with its bottom edge forming a scraper, and joining said first-referred-to member, near the forward edge of the latter, said cutter and scraper having their cutting and scraping edges, respectively in general planes at right angles to each other.

2. A device of the character described, comprising a right-lined plate or member having a forward end angular portion, equipped with a cutter, and a moldboard and share-like member joining the former near its forward end portion and carried downward and forward to the lower end of said forward end portion, and forming a scraper, said cutter and scraper having their cutting and scraping edges, respectively in planes as aforesaid.

3. A device of the character described, comprising a "landside" member having a forward end angular portion equipped with an angularly-adjustable cutter, and a moldboard-like member joining the first-referred-to member, near said forward end angular portion, and having a laterally-inclined and rearward-diverging bottom edge adapted to serve as a scraper, said cutter and scraper having their cutting and scraping edges, respectively in planes as aforesaid.

4. A device of the character described, comprising a "landside" member having a forward end angular portion, with a vertically-inclined forward edge, equipped with a cutter having a corresponding inclination, and a second member having a general lateral and rearward inclination, with its forward end curved downward and forward to the lower edge of said angular portion and further inclined at its bottom edge from said lower edge of said angular portion rearward and outward, forming a scraper, said cutter and scraper having their cutting and scraping edges, respectively in planes at right angles to each other.

5. A machine of the character described, consisting of a "landside" member having an angular forward end portion, with an upward and outward inclination and equipped with a cutter having a pivotal connection at its lower end with said angular portion and angularly adjustable, a moldboard and share-like member joining said first-referred-to member near said angular portion and having its forward end curved downward and forward to the lower edge of said angular portion, said latter member also being inclined at its bottom edge rearward and outward forming thereby a scraper, said landside member and moldboard and share-like member having arranged and journaled therebetween rolls or trucks, and means for manually operating the machine.

In testimony whereof I have signed my name to this specification in the presence of two subscribing witnesses.

JOSEPH CARD.

Witnesses:
 JAMES E. McGORRY,
 JOHN A. O'KEEFE